(12) United States Patent
Wu

(10) Patent No.: US 11,456,951 B1
(45) Date of Patent: Sep. 27, 2022

(54) FLOW TABLE MODIFICATION FOR NETWORK ACCELERATORS

(71) Applicant: Xilinx, Inc., San Jose, CA (US)

(72) Inventor: Chunhua Wu, Shanghai (CN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/225,737

(22) Filed: Apr. 8, 2021

(51) Int. Cl.
*G06F 15/173* (2006.01)
*H04L 45/00* (2022.01)
*H04L 45/42* (2022.01)
*H04L 45/02* (2022.01)

(52) U.S. Cl.
CPC .............. *H04L 45/38* (2013.01); *H04L 45/02* (2013.01); *H04L 45/42* (2013.01); *H04L 45/566* (2013.01)

(58) Field of Classification Search
CPC ......... H04L 45/38; H04L 45/02; H04L 45/42; H04L 45/566
USPC .......................... 709/238, 235, 234, 231, 202
See application file for complete search history.

(56) References Cited

U.S. PATENT DOCUMENTS

| | | | |
|---|---|---|---|
| 6,091,263 A | 7/2000 | New et al. |
| 6,150,839 A | 11/2000 | New et al. |
| 6,204,687 B1 | 3/2001 | Schultz et al. |
| 6,462,579 B1 | 10/2002 | Camilleri et al. |
| 6,507,211 B1 | 1/2003 | Schultz et al. |
| 6,525,562 B1 | 2/2003 | Schultz et al. |
| 6,526,557 B1 | 2/2003 | Young et al. |
| 6,573,748 B1 | 6/2003 | Trimberger |
| 6,625,794 B1 | 9/2003 | Trimberger |
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,109,750 B2 | 9/2006 | Vadi et al. |
| 7,124,338 B1 | 10/2006 | Mark et al. |

(Continued)

FOREIGN PATENT DOCUMENTS

| | | |
|---|---|---|
| WO | 2010012568 A1 | 2/2010 |
| WO | 2020097013 A1 | 5/2020 |

OTHER PUBLICATIONS

Abel, F., et al., "An FPGA Platform for Hyperscalers," In 2017 IEEE 25th Annual Symposium on High-Performance Interconnects (HOTI) Aug. 2, 20178 (pp. 29-32). IEEE.

(Continued)

*Primary Examiner* — Lan Dai T Truong
(74) *Attorney, Agent, or Firm* — Kevin T. Cuenot

(57) ABSTRACT

Modifying a flow table for a network accelerator can include, in response to determining that a flow table of a network accelerator does not include any rules corresponding to first packet data of a first flow received from a network, forwarding the first packet data to a host computer. Subsequent to the flow table being updated to include a new rule for the first flow, for second packet data of the first flow received from the network, the second packet data can be processed using the new rule. The second packet data can be queued. In response to receiving the first packet data from the host computer, the first packet data can be processed using the new rule. The processed packet data can be forwarded to a destination port followed by the queued second packet data.

20 Claims, 6 Drawing Sheets

(56) References Cited

U.S. PATENT DOCUMENTS

| | | | |
|---|---|---|---|
| 7,138,820 | B2 | 11/2006 | Goetting et al. |
| 7,218,137 | B2 | 5/2007 | Vadi et al. |
| 7,224,184 | B1 | 5/2007 | Levi et al. |
| 7,233,532 | B2 | 6/2007 | Vadi et al. |
| 7,235,999 | B2 | 6/2007 | Goetting et al. |
| 7,302,625 | B1 | 11/2007 | Payakapan et al. |
| 7,477,072 | B1 | 1/2009 | Kao et al. |
| 7,478,357 | B1 | 1/2009 | Mason et al. |
| 7,482,836 | B2 | 1/2009 | Levi et al. |
| 7,509,617 | B1 | 3/2009 | Young |
| 7,518,396 | B1 | 4/2009 | Kondapalli et al. |
| 7,546,572 | B1 | 6/2009 | Ballagh et al. |
| 7,577,707 | B2 | 8/2009 | Hufferd et al. |
| 7,590,790 | B2 | 9/2009 | Wang et al. |
| 7,599,299 | B2 | 10/2009 | Goetting et al. |
| 7,619,442 | B1 | 11/2009 | Mason et al. |
| 7,640,527 | B1 | 12/2009 | Dorairaj et al. |
| 7,724,815 | B1 | 5/2010 | Raha et al. |
| 7,746,099 | B1 | 6/2010 | Chan et al. |
| 7,752,349 | B2 | 7/2010 | Ishida et al. |
| 8,102,188 | B1 | 1/2012 | Chan et al. |
| 8,359,448 | B1 | 1/2013 | Neuendorffer |
| 8,415,974 | B1 | 4/2013 | Lysaght |
| 8,504,373 | B2 | 8/2013 | Bansal et al. |
| 8,719,750 | B1 | 5/2014 | Balzli, Jr. |
| 8,928,351 | B1 | 1/2015 | Konduru |
| 9,218,443 | B1 | 12/2015 | Styles |
| 9,257,987 | B1 | 2/2016 | Molson |
| 9,722,613 | B1 | 8/2017 | Schultz et al. |
| 10,447,273 | B1 | 10/2019 | Roberts |
| 10,725,942 | B2 | 7/2020 | Thyamagondlu et al. |
| 2003/0021346 | A1 | 1/2003 | Bixby et al. |
| 2003/0097498 | A1 | 5/2003 | Sano et al. |
| 2004/0019729 | A1 | 1/2004 | Kelley et al. |
| 2005/0114566 | A1 | 5/2005 | Chen et al. |
| 2005/0228913 | A1 | 10/2005 | Matthews et al. |
| 2006/0265531 | A1 | 11/2006 | Adams et al. |
| 2007/0208895 | A1 | 9/2007 | Chang et al. |
| 2008/0279209 | A1 | 11/2008 | Hui |
| 2010/0186014 | A1 | 7/2010 | Vaghani et al. |
| 2010/0321397 | A1 | 12/2010 | Ginzburg |
| 2013/0160016 | A1 | 6/2013 | Gummaraju et al. |
| 2015/0095109 | A1 | 4/2015 | Kodde |
| 2015/0134891 | A1 | 5/2015 | Jo |
| 2016/0182380 | A1* | 6/2016 | Mehra ................. H04L 45/7453 709/226 |
| 2016/0203091 | A1 | 7/2016 | Lee |
| 2016/0261507 | A1* | 9/2016 | Kwak .................. H04L 47/125 |
| 2017/0206169 | A1 | 7/2017 | Coppola et al. |
| 2018/0159765 | A1* | 6/2018 | Shi ......................... H04L 45/24 |
| 2018/0181431 | A1* | 6/2018 | Vincent ............... H04L 12/4633 |
| 2018/0337849 | A1* | 11/2018 | Sharma ................ H04L 43/026 |
| 2019/0065290 | A1 | 2/2019 | Custodio |
| 2019/0096813 | A1 | 3/2019 | Lesea |
| 2019/0123884 | A1* | 4/2019 | Murphree ............. H04L 1/1664 |
| 2019/0138493 | A1 | 5/2019 | Teh et al. |
| 2020/0151120 | A1 | 5/2020 | Thyamagondlu et al. |
| 2020/0153756 | A1 | 5/2020 | Thyamagondlu et al. |
| 2021/0021520 | A1* | 1/2021 | Wetterwald ........... H04L 47/323 |
| 2021/0234745 | A1* | 7/2021 | Mendes .............. H04W 40/246 |
| 2021/0243135 | A1* | 8/2021 | Garcia-Luna-Aceves ................... H04L 47/562 |

OTHER PUBLICATIONS

Anderson, B., Detecting Encrypted Malware Traffic (Without Decryption), [online] Cisco Blog/Security, Jun. 23, 2017, retrieved from the Internet: <https://blogs.cisco.com/security/detecting-encrypted-malware-traffic-without-decryption>, 9. pg.

Chiou, D., "The Microsoft catapult project," In 2017 IEEE International Symposium on Workload Characterization (IISWC) Oct. 1, 2017 (pp. 124-124). IEEE.

Firestone, D. et al., "Azure Accelerated Networking: SmartNICs in the Public Cloud," In 15th {USENIX} Symposium on Networked Systems Design and Implementation ({NSDI} 18), 2018, pp. 51-66.

Liguori, A., "The Nitro Project: Next-Generation EC2 Infrastructure," AWS Tech Talks (webinar, talk with slides), Feb. 5, 2018. YouTube video.

Mellanox Technologies, "Mellanox Innova—2 Flex Open Programmable SmartNIC," 2018 , Product Brochure MLNX54019PG, Rev. 1.4, 3 pg.

Microsoft, Inc., "Microsoft unveils Project Brainwave for real-time AI—Microsoft Research," [olnline] Microsoft © 2019, retrieved from the Internet: <https://www.microsoft.com/en-us/research/blog/microsoft-unveils-project-brainwave/>, 8 pg.

SolarFlare Communications, Inc., "SFA7942Q Dual-Port 40GbE QSFP+Halfl-Lenth ApplicationOnload Engine," 2015, Product Brochure SF-114649-CD Issue 3, 2 pg.

Xilinx Inc., White Paper WP499, Breathe New Life into Your Data Center with Alveo Adaptable Accelerator Cards, San Jose, CA USA.

Xilinx Inc.,White Paper WP505, Versal: The First Adaptive Compute Acceleration Platform (ACAP), San Jose, CA USA.

Xilinx, Inc.,"SDAccel Environment User Guide," UG1023 (V2018. 3), Jan. 24, 2019, 165 pg, San Jose, CA USA.

"QDMA Subsystem for PCI Express v1.0," Product Guide PG302 (v1.0), Vivado Design Suite, Apr. 17, 2018, Xilinx, Inc., Copyright © 2018, San Jose, CA, 157 pg.

Sunkavalli, R., "Network Acceleration XDF 2018," Xilinx Developer Forum 2018 (Silicon Valley), Oct. 1, 2018, XP055684236, Retrieved from the Internet: <https://www.xilinx.com/content/dam/xilinx/imgs/developer-forum/2018-silicon-valley/Cloud-Converged-10-Acceleration-Platform.pdf>, retrieved Apr. 8, 2020, pp. 5-13.

* cited by examiner

300

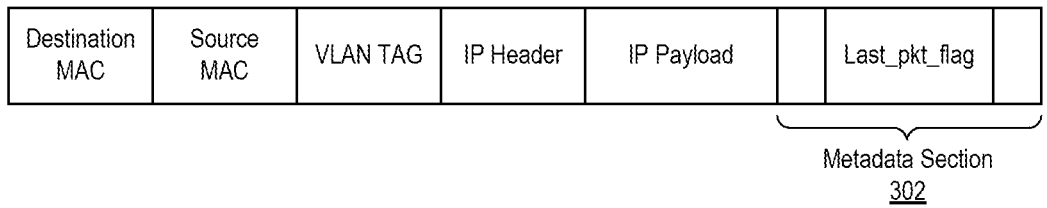

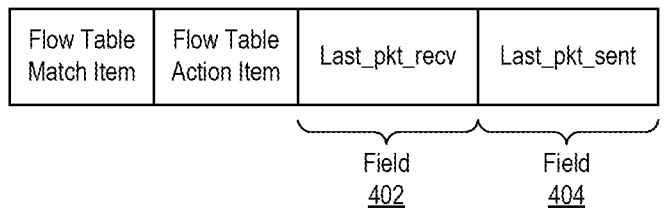

| In response to determining that a flow table of a network accelerator does not include any rules corresponding to first packet data of a first flow received from a network, forwarding the first packet data to a host computer
502 |
|---|
| Subsequent to the flow table being updated to include a new rule for the first flow, processing second packet data of the first flow received from the network using the new rule and queuing the second packet data
504 |
| In response to receiving the first packet data from the host computer, processing the first packet data using the new rule and forwarding the first packet data to a destination port followed by the queued second packet data
506 |

FIG. 5

FLOW TABLE MODIFICATION FOR NETWORK ACCELERATORS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to network accelerators and, more particularly, to modifying tables of a network accelerator within a computing system for packet processing.

BACKGROUND

The performance of a computing system may be improved by incorporating certain devices generally referred to as hardware accelerators into the computing system. A hardware accelerator may be connected to a computing system, e.g., a server, as a peripheral device. The hardware accelerator includes hardware that is specifically adapted or customized to perform particular operations. Typically, the hardware accelerator is capable of performing these operations more efficiently than if the central processing unit (CPU) of the server were to do so through execution of software. As such, the CPU offloads certain operations to the hardware accelerator, thereby enhancing the performance of the server. For example, the hardware accelerator may perform certain operations in less time than the CPU and/or perform the operations using less power than the CPU. The performance benefits can be particularly significant in data center environments that include many servers.

SUMMARY

In one aspect, a method can include, in response to determining that a flow table of a network accelerator does not include any rules corresponding to first packet data of a first flow received from a network, forwarding the first packet data to a host computer. The method also can include, subsequent to the flow table being updated to include a new rule for the first flow, for second packet data of the first flow received from the network, processing the second packet data using the new rule and queuing the second packet data. The method further can include, in response to receiving the first packet data from the host computer, processing the first packet data using the new rule and forwarding the first packet data to a destination port followed by the queued second packet data.

In another aspect, a system can include a controller. The controller is configured to initiate operations. The operations can include, in response to determining that a flow table does not include any rules corresponding to first packet data of a first flow received from a network, forwarding the first packet data to a host computer. The operations also can include, subsequent to the flow table being updated to include a new rule for the first flow, for second packet data of the first flow received from the network, processing the second packet data using the new rule and queuing the second packet data. The operations further can include, in response to receiving the first packet data from the host computer, processing the first packet data using the new rule and forwarding the first packet data to a destination port followed by the queued second packet data.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example of a packet that may be processed by a network accelerator.

FIG. 4 illustrates an example rule that may be stored in a flow table of a network accelerator.

FIG. 5 illustrates an example method of processing packets.

DETAILED DESCRIPTION

Figure 1:
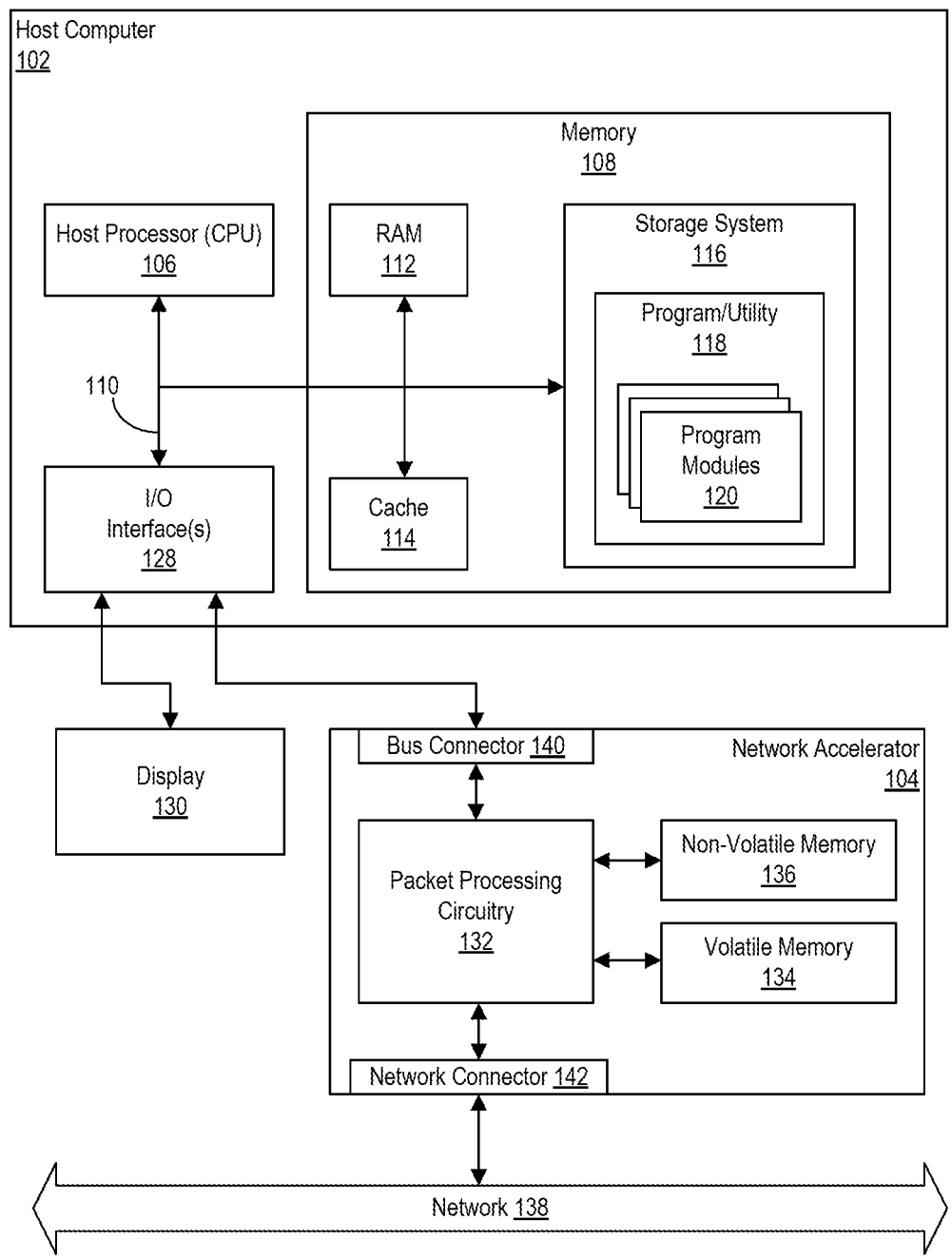
FIG. 1 illustrates an example computing system for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to network accelerators and, more particularly, to modifying tables of a network accelerator within a computing system for packet processing. A network accelerator is a variety of hardware accelerator. A network accelerator refers to hardware that is adapted or customized to perform network functions. A network accelerator may be incorporated into a computing system to improve the performance of the computing system by performing network related operations so that the central processing unit (CPU) of the computing system is spared from performing the network related operations and free to perform other operations. Whereas a hardware accelerator may perform operations that originate from the computing system, the network accelerator attempts to process data received from a network and prevent much of such data from reaching the computing system in the first place.

In general, a computing system such as a server is coupled to a network. The computing system is capable of sending data out over the network and receiving data from the network. The path for sending and receiving data for the computing system by way of the network may be referred to as the "network path." The network path may be subdivided, by function, into a data plane and a control plane. The data plane is responsible for analyzing, modifying, and switching the data flow. The control plane is responsible for monitoring the data flow and updating flow tables.

Data plane operations may be performed by the CPU of the computing system. The CPU, in performing control plane operations, is capable of downloading flow tables to the network accelerator. The flow tables define packet processing operations to be performed by the network accelerator. The network accelerator is capable of processing packets received over the network path for which rules exist in the flow table contained in the network accelerator. For those packets belonging to a flow for which a rule in the flow table does not exist, the network accelerator forwards the packets of the flow to the CPU for processing.

The CPU is capable of determining the correct processing for the packets received from the network accelerator. The CPU further is capable of updating the flow table in the network accelerator. The CPU, for example, is capable of downloading a new packet processing rule (rule) to the flow table in the network accelerator for the newly detected flow. The new rule specifies the processing to be performed for any packets belonging to the flow. The network accelerator is then able to process any follow-up packets of the flow that may be received from the network per the new rule.

Still, the CPU provides any packets of the flow received from the network accelerator back to the network accelerator for processing in accordance with the new rule. Due to the time needed for packets to traverse from the network accelerator to the CPU and back, the network accelerator may process follow-up packets received by the network accelerator from the network subsequent to the flow table being updated, but prior to receiving the packets of the flow back from the CPU. Were the network accelerator to simply process the follow-up packets of the flow using the new rule without regard for the packets of the flow being sent back from the CPU, the network accelerator could send out-of-order packets. Out-of-order packets for a given flow, for some networking applications, is unacceptable and may cause network errors.

In accordance with the inventive arrangements described within this disclosure, the flow tables of a network accelerator may be updated in a manner that addresses out-of-order packet processing. The CPU is capable of updating the flow table of the network accelerator in a seamless manner. Those packets of a flow in transit between the network accelerator and the CPU may be processed according to the order in which packets of the flow were originally received from the network by the network accelerator, thereby avoiding network errors induced by out-of-order packets in a flow.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system 100 for use with the inventive arrangements described within this disclosure. Computing system 100 includes a host computer (e.g., a server) 102 coupled to a network accelerator 104. Network accelerator 104 is capable of sending and receiving data by way of network 138 via network ports. Further, network accelerator 104 is capable of performing packet processing operations.

The components of host computer 102 may include, but are not limited to, a host processor 106 (e.g., a central processing unit or CPU), a memory 108, and a bus 110 that couples various system components including memory 108 to host processor 106. Host processor 106 may be implemented as any of a variety of processors that are capable of executing program code. Example processor types include, but are not limited to, processors having an x86 type of architecture (Intel Architecture 32-bit, Intel Architecture 64-bit, etc.), Power Architecture, ARM processors, and the like. Further, host computer 102 may include more than one processor. Such processors may include multiple cores.

Bus 110 represents one or more of any of several types of communication buses. Examples of communication buses include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host computer 102 typically includes a variety of computer readable media. Such media may be any available media that is accessible by host computer 102 and may include any combination of volatile media, non-volatile media, removable media, and/or non-removable media.

Memory 108 may include computer readable media in the form of volatile memory, such as random-access memory (RAM) 112 and/or cache memory 114. Host computer 102 may also include other removable/non-removable, volatile/non-volatile computer system storage media. By way of example, memory 108 can include a storage system 116 that is capable of reading from and writing to a non-removable, non-volatile magnetic and/or solid state media contained therein (e.g., a "hard drive"). In other examples, storage system 116 may include or be implemented as, a magnetic disk drive for reading from and writing to a removable, non-volatile magnetic disk (e.g., a "floppy disk") and/or an optical disk drive for reading from or writing to a removable, non-volatile optical disk such as a CD-ROM, DVD-ROM or other optical media. In such instances, each may be connected to bus 110 by one or more data media interfaces. Memory 108 is an example of at least one computer program product having one or more program modules 120 (e.g., program code) stored therein.

In one aspect, storage system 116 includes a program/utility 118. Program/utility 118 includes program modules 120. Program modules 120, being stored in memory 108, may include, but are not limited to, an operating system, one or more application programs (e.g., user applications), other program modules, and/or program data. Program modules 120, when executed by processor 106, generally carry out the functions and/or methodologies described herein with respect to operations performed by host computer 102 and/or processor 106.

For example, program modules 120 may include user applications and/or a software stack. The software stack may implement a runtime environment capable of performing host computer 102 operations described herein with regard to network accelerator 104. In one aspect, program modules 120 include a driver or daemon capable of communicating with network accelerator 104 and/or packet processing circuitry 132. For example, one more program modules 120 may implement a control plane capable of updating flow tables of network accelerator 104.

Program/utility 118 is executable by host processor 106. Program/utility 118 and any data items used, generated, and/or operated on by host processor 106 are functional data structures that impart functionality when employed by host processor 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 128 communicatively linked to bus 110. I/O interface(s) 128 allow host computer 102 to communicate with external devices, couple to external devices that allow user(s) to interact with host computer 102, couple to external devices that allow host computer 102 to communicate with other computing devices, and the like. For example, host computer 102 may be communicatively linked to a display 130 and to network accelerator 104 through I/O interface(s) 128. Host computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host computer 102 communicates with network accelerator 104 is a PCIe adapter. Network accelerator 104 may be implemented as a circuit board (e.g., a "card") that couples to host computer 102. Network accelerator 104 may, for example, be inserted into a card slot, e.g., an available bus and/or PCIe slot, of host computer 102.

Network accelerator 104 includes packet processing circuitry 132. In one aspect, packet processing circuitry is implemented as an integrated circuit (IC) disposed on network accelerator 104. In one example, the IC is implemented as an application-specific IC (ASIC). The IC may be implemented entirely using hardened circuitry. In another example, the IC is implemented as a programmable IC. An example of a programmable IC is a Field Programmable Gate Array. In other examples, the IC may include a combination of hardened circuitry and programmable logic.

In the example of FIG. 1, network accelerator 104 optionally includes a volatile memory 134 coupled to packet processing circuitry 132 and optionally a non-volatile memory 136 also coupled to packet processing circuitry 132. Volatile memory 134 may be implemented as a RAM that is external to packet processing circuitry 132. Volatile memory 134 is considered a "local memory" of packet processing circuitry 132, whereas memory 108, being within host computer 102, is not considered local to packet processing circuitry 132. Non-volatile memory 136 may be implemented as flash memory. Non-volatile memory 136 is also external to packet processing circuitry 132 and may be considered local to packet processing circuitry 132.

In the example of FIG. 1, network accelerator 104 includes a bus connector (e.g., a physical connector) 140. Bus connector 140 may be used to physically couple network accelerator 104 to the communication bus communicatively linking host computer 102 with network accelerator 104. Bus connector 140 is further coupled to packet processing circuitry 132. For example, bus connector 140 may be implemented as a PCIe connector (e.g., a card edge or other connector). Network accelerator 104 further can include a network connector 142 (e.g., a physical connector). Network connector 142 may be used to physically connect network accelerator 104 to network 138. Network connector 142, for example, may be an Ethernet port. Packet processing circuitry 132 is coupled to network connector 142.

In one example, network 138 is an Ethernet network. Network 138 may operate at any of a variety of different speeds. For example, network 138 may be a 10G, 25G, 50G, 100G, 200G, 400G, or other speed network. In particular implementations, network 138 may be, include, or couple to a 5G network. Packet processing circuitry 132, being coupled to network connector 142, is communicatively linked to network 138. For example, packet processing circuitry 132 may be connected, via network 138, to an Ethernet switch or one or more other network connected devices. For purposes of illustration, the term "network" refers to network 138 herein.

FIG. 1 is not intended to suggest any limitation as to the scope of use or functionality of the examples described herein. Host computer 102 is an example of computer hardware (e.g., a system) that is capable of performing the various operations described within this disclosure relating to network accelerator 104 and/or packet processing circuitry 132.

Host computer 102 is only one example implementation of a computer that may be used with network accelerator 104. Host computer 102 is shown in the form of a computing device, e.g., a computer or server. In one aspect, host computer 102 can be practiced within a data center. For example, host computer 102 may be practiced as a stand-alone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

A data center refers to a dedicated space such as a room or building that houses computing resources. Examples of computing resources include, but are not limited to, servers, routers, switches, firewalls, telecommunications equipment, and/or storage systems. The data center often includes supporting components like backup equipment, fire suppression facilities, and air conditioning. A data center may be private or shared. Typically, the data center restricts access to the computing hardware to only authorized personnel.

The term "cloud computing" refers to a computing model that facilitates convenient, on-demand network access to a shared pool of configurable computing resources such as networks, servers, storage, applications, ICs (e.g., programmable ICs and/or ASICs), accelerators, and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments, edge computing environments, and/or data centers, generally support the FPGA-as-a-Service (FaaS) model. In the FaaS model, user functions and/or network functions are hardware accelerated as circuit designs implemented within programmable ICs operating under control of host computer 102. Other examples of cloud computing models are described in the National Institute of Standards and Technology (NIST) and, more particularly, the Information Technology Laboratory of NIST.

Host computer 102 is operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
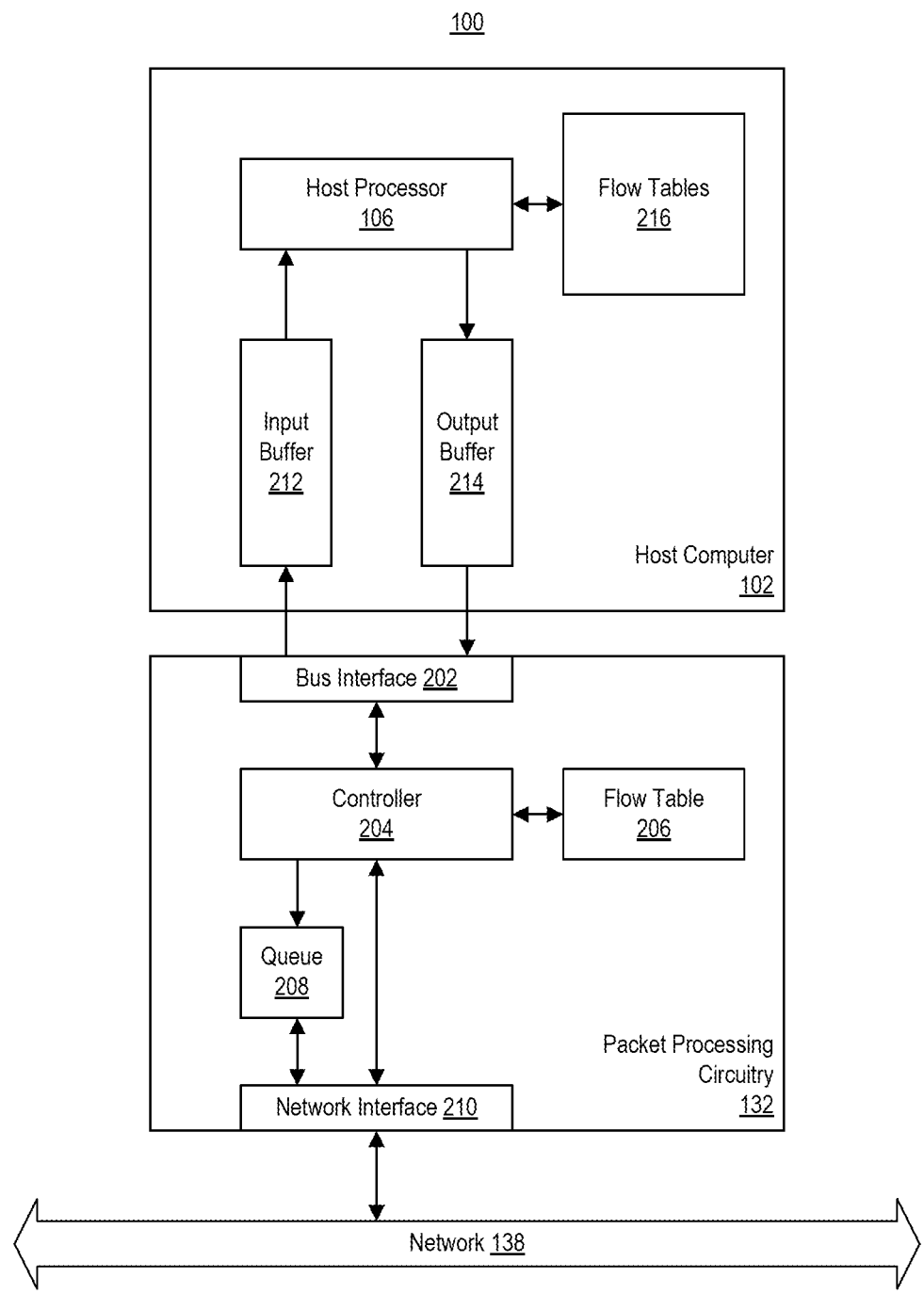
FIG. 2 illustrates another example implementation of the computing system of FIG. 1.

FIG. 2 illustrates another example implementation of computing system 100. In the example of FIG. 2, for purposes of illustration and description, certain elements of computing system 100 are omitted. For example, certain elements of host computer 102 are omitted as are other elements such as network accelerator 104 on which packet processing circuitry 132 may be disposed.

In the example, packet processing circuitry 132 includes a bus interface 202, a controller 204, a flow table 206, a queue 208, and a network interface 210. Bus interface 202 is implemented as circuitry that couples to bus connector 140 (not shown) of FIG. 1. For example, bus interface 202 may be implemented as a PCIe endpoint. Flow table 206 is capable of storing one or more rules. Queue 208 is capable of storing packet data. Flow table 206 and queue 208 are implemented in memories within packet processing circuitry 132. In one aspect, though shown as independent and separate elements, flow table 206 and queue 208 may be implemented in a same memory within packet processing circuitry 132. In another aspect, flow table 206 and queue 208 may be implemented in separate memories. Network interface 210 may be implemented as circuitry that couples to network connector 142 (not shown). For example, network interface 210 may be implemented as an Ethernet interface.

In the example of FIG. 2, packet processing circuitry 132 is capable of receiving packet data, e.g., one or more packets, from network 138. Packet data enters packet processing circuitry 132 via network interface 210. Controller 204 is capable of determining whether flow table 206 includes a rule that may be used to process packets of the packet data. For example, any packet can be classified into a particular "flow" by one or more specified fields of the packet referred to as tuples. A "flow" refers to a set of packets having same values for the specified fields or tuples. For example, a flow may be one or more packets corresponding to a particular application. Thus, packets of a same flow are considered related and may be ordered or have a particular sequence. Example tuples for use in classification of a packet (e.g., matching a packet to a rule in flow table 206 for processing thereof) include, but are not limited to, source Internet Protocol (IP) address, destination IP address, protocol, source Transmission Control Protocol (TCP) port, and destination TCP port.

Controller 204 is capable of analyzing received packets and determining whether a rule in flow table 206 matches (e.g., corresponds to) the received packet by matching the specified fields from the packet that indicate the flow to those of a rule in flow table 206. Rules in flow table 206, however, are not pre-configured. Rather, new flows are found in the case where controller 204 determines that no rule in flow table 206 corresponds the flow of a packet received from network 138. In that case, controller 204 communicates with host computer 102 to obtain a new rule to process packets of the flow. Accordingly, in response to determining that flow table 206 does not include a rule that is applicable to (e.g., matches) the packet data, controller 204 forwards the packet data to host processor 106 via bus interface 202, e.g., over the PCIe link.

The packet data enters input buffer 212. Host processor 106 is capable of determining a rule for processing the received packet data (e.g., a rule for the flow), updating flow tables 216, and updating flow table 206 within packet processing circuitry 132. Host processor 106 may then forward the packet data of the flow back to packet processing circuitry 132 via output buffer 214 to bus interface 202, e.g., via the PCIe link. With flow table 206 updated with the new rule, controller 204 is capable of processing any further packet data received from network 138 for the flow, e.g., follow-up packet data, using the new rule. This means that controller 204 may process the follow-up packet data of the flow and forward the processed follow-up packet data to an appropriate destination port (e.g., via network interface 210) per the new rule.

In the time that passes between sending the packet data of the flow for which no rule exists in flow table 206 to host computer 102 and updating flow table 206 with the new rule, controller 204 may send one or more or many packets of the flow to host computer 102. For any packet data of the flow sent to host computer 102 to make the round trip back to packet processing circuitry 132, a delay is incurred. Packet processing circuitry 132 may receive further packets of the flow from network 138 that correspond to the new rule and process those packets using the new rule in flow table 206 prior to receiving the packet data of the flow back from host computer 102. For example, packet data of the flow sent to host computer 102 may still be queued in host computer 102 or in transit between packet processing circuitry 132 and host computer 102. One reason for this is the greater efficiency with which network accelerator 104 is capable of processing packets compared to host computer 102. This condition may result in controller 204 sending packets of the flow to network interface 210 in an order that is different from the order in which the packets of the flow were received by packet processing circuitry 132 from network 138.

Consider an example where starting at time T0 controller 204 forwards one or more packets referred to as first packet data to host processor 106 in response to determining that flow table 206 includes no rule that applies to the first packet data. The first packet data (e.g., data between time T0 and time T1) may belong to a particular flow called flow X. At time T1 host processor 106 updates flow table 206 with a new rule indicating how to process packets of flow X. Between time T1 and time T2, packet processing circuitry 132 receives one or more further packets referred to as second packet data. The second packet data also belongs to flow X. Time T2 is the time at which packet processing circuitry 132 receives the last packet of the first packet data back from host computer 102. Because packets of the flow may be continuously forwarded to the control plane at least until such time that host processor 106 adds the new rule for the flow to flow table 206 and, in some cases for a short time thereafter, there may be many packets of the flow that have been stored in the buffers of host computer 102 or that are in transit between host computer 102 and network accelerator 104 (e.g., between time T1 and time T2 or shortly thereafter time T2). Accordingly, in an example implementation, controller 204 is capable of processing the second packet data per the new rule. Rather than forward the processed second packet data to a destination port per the new rule, however, controller 204 is capable of queuing the processed second packet data (e.g., storing the processed second packet data in queue 208).

Accordingly, controller 204, in response to receiving the first packet data back from host computer 102 is capable of processing the first packet data (e.g., modifying the packets per the new rule) and forwarding the processed first packet data to the appropriate destination port per the new rule. In one aspect, in response to processing and forwarding the last packet of the first packet data to the destination port, controller 204 is capable of forwarding the processed second packet data from queue 208 to the appropriate destination port. The queueing performed by controller 204 sends the packets to the destination port in the same order as received by packet processing circuitry 132 from network 138. The packets belonging to flow X, for example, are related and may be time sequenced for a particular application. Maintaining the order of the packets of a particular flow prevents out-of-order packets and possible error conditions. With the queued packets having been sent, controller 204 may process any further received packets belonging to flow X (e.g., third packet data received from network 138 after time T2) and forward such packets to the appropriate destination port without queueing. That is, controller 204 may discontinue queuing of packets for flow X subsequent to time T2.

FIG. 3 illustrates an example of a packet 300 that may be processed by the packet processing circuitry 132. Packet 300 may include sections such as a destination Media Access Control (MAC), a source MAC, a Virtual Local Area Network (VLAN) tag, an IP header, and an IP payload. In an example implementation, controller 204 is capable of adding a metadata section 302 to packet 300. Metadata section 302 may include a flag referred to as the "last_pkt_flag." The last_pkt_flag may be implemented as a 1-bit flag that indicates whether the packet is the last packet of a particular flow that is being forwarded to host computer 102. For example, controller 204 is capable of setting the last_pkt_flag of the last packet of a flow being sent to host computer 102 to true. Controller 204 sets the last_pkt_flag of those packets of the flow that are not the last packet being sent to false.

For example, controller 204 is capable of adding metadata section 302 including the last_pkt_flag to each packet that is forwarded to host computer 102. Only the last packet of the flow that is forwarded to host computer 102, however, will have the last_pkt_flag set to true.

FIG. 4 illustrates an example rule 400 that may be stored in flow table 206. In the example of FIG. 4, rule 400 includes a flow table match item, a flow table action item, and added or new fields 402 and 404. Each rule in the flow table corresponds to a different and particular flow and is used to process packets belonging to that flow as identified by the flow table match item. For example, the flow table match item may include one or more of the specified tuples used to define a flow and match a packet to rule 400. Flow table action item specifies any processing to be performed on the packet (e.g., modifications to the packet) and the destination port to which the packet is to be sent.

Field 402 is a "last_pkt_recv" field that is updatable by controller 204. Field 404 is a "last_pkt_sent" field that is also updatable by controller 204. In one aspect, each of fields 402 and 404 may be 1-bit fields. The last_pkt_sent (field 404) is managed by controller 204. When last_pkt_sent of a rule in flow table 206 is true, the last packet of the flow with the last_pkt_flag set to true has been forwarded to host computer 102. When the last_pkt_recv of a rule in flow table 206 is true, the last packet of the flow with the last_pkt_flag set to true has been received back from host computer 102.

In an example implementation, last_pkt_sent is initially set to false (e.g., zero) for a new rule added to flow table 206 by host processor 106. In response to receiving a new packet, packet processing circuitry 132 is capable of performing a lookup in flow table 206 to determine whether a rule is hit (e.g., whether the packet corresponds to or is matched to a rule). If no rules in flow table 206 match the packet, controller 204 forwards the packet to host processor 106 so that the control plane, as implemented by host computer 102, determines the appropriate processing for packets of the flow. In response to determining a rule of flow table 206 that corresponds to the packet, if the last_pkt_sent of the rule is false, controller 204 sets the last_pkt_sent of the rule to true, sets the past_pkt_flag of the packet to true, and forwards the packet to host computer 102. Otherwise, controller 204 processes the packet according to the actions defined by the rule from flow table 206 that corresponds to the packet.

FIG. 5 illustrates an example method 500 of processing packets. Method 500 may be performed by network accelerator 104 of FIG. 1. For example, the operations described in connection with FIG. 5 may be performed by controller 204 of packet processing circuitry 132.

In block 502, in response to determining that a flow table of a network accelerator does not include any rules corresponding to first packet data of a first flow received from a network, the controller is capable of forwarding the first packet data to a host computer. In block 504, subsequent to the flow table being updated to include a new rule for the first flow, for second packet data of the first flow received from the network, the controller is capable of processing the second packet data using the new rule and queueing the second packet data. In block 506, in response to receiving the first packet data from the host computer, the controller is capable of processing the first packet data using the new rule and forwarding the first packet data to a destination port followed by the queued second packet data.

Network accelerator 104, e.g., packet processing circuitry 132, is capable of performing a variety of operations that may vary depending on whether a packet is received from the network or from the host computer. For example, for a packet that is received from the network, the network accelerator performs a lookup in the flow table(s) contained therein using tuples from the packet. If the packet matches a rule in the flow table, the network accelerator is capable of performing the following operations:

If both the last_pkt_sent field and last_pkt_recv field are true, the network accelerator modifies the packet per the rule and forwards the packet to the destination also specified by the rule.

If the last_pkt_sent field is true and the last_pkt_recv field is false, the network accelerator modifies the packet based on the matched rule in the flow table of the network accelerator. The network accelerator stores (e.g., queues) the modified packet until the packet with last_pkt_flag set to true is received back from the host computer.

If both the last_pkt_sent and last_pkt_recv fields are false, the network accelerator forwards the packet to the host computer with appended metadata (e.g., including the last_pkt_flag). In doing so, the network accelerator sets the last_pkt_flag to true.

If the packet does not match any rule in the flow table of the network accelerator, the network accelerator forwards the packet to the host computer with appended metadata. In that case, the network accelerator sets the last_pkt_flag of the metadata to false.

In one aspect, all packets in the control plane (forwarded to the host computer) are eventually forwarded back to the data plane (network accelerator) to be sent to a destination port. When the network accelerator receives a packet from the host computer, the network accelerator is capable of performing the following operations:

The network accelerator looks up the new rule for the flow to which the packet received from the host computer belongs by the tuples of the packet.

The network accelerator modifies the packet as specified by the new rule for the flow and forwards the packet to the destination port specified by the new rule for the flow.

If the last_pkt_flag bit in the metadata for the packet is true, the network accelerator sets the last_pkt_recv field for the new rule for the flow to true.

Figure 6:
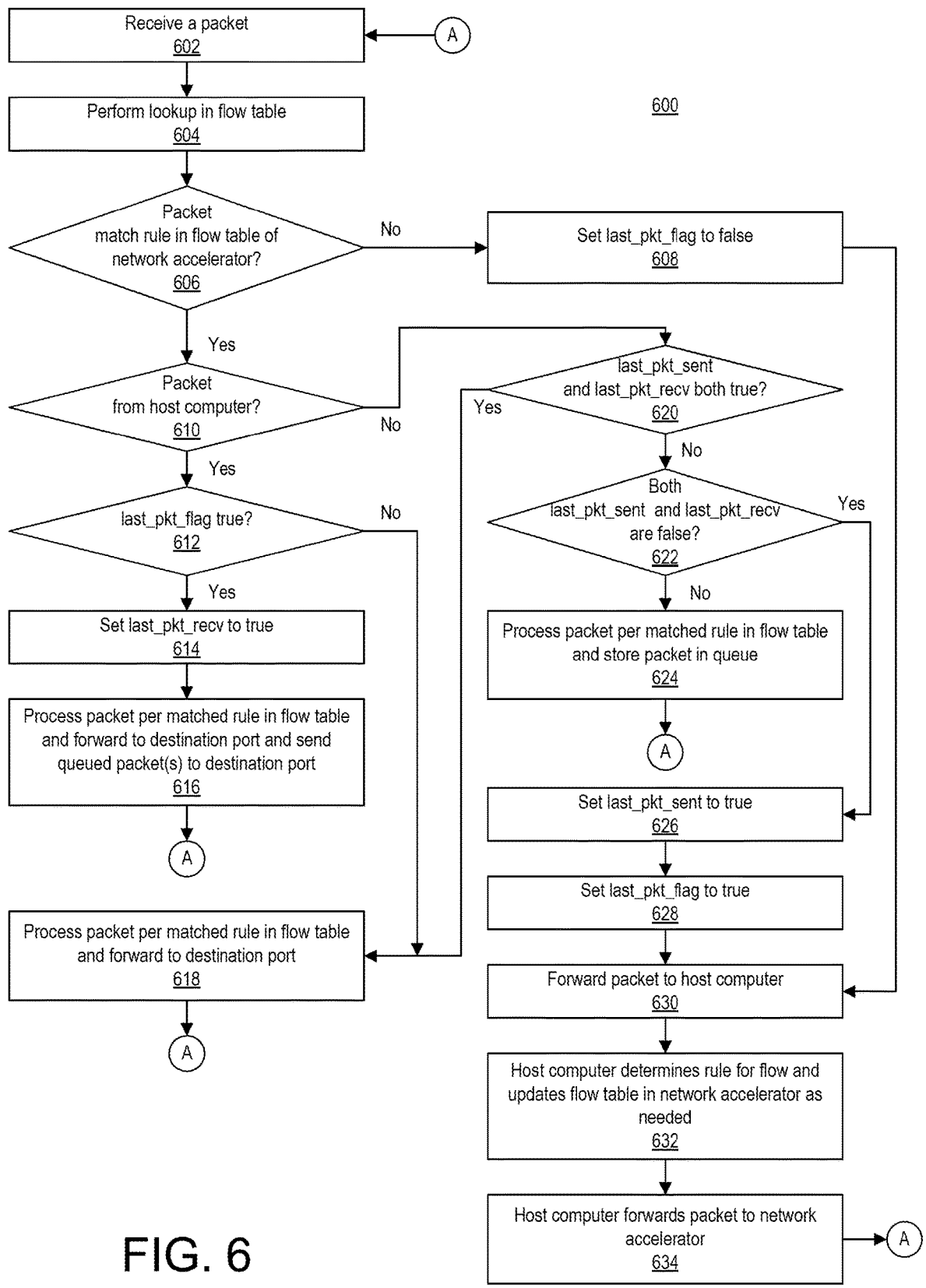
FIG. 6 illustrates another example method of processing packets.

FIG. 6 illustrates another example method 600 of processing packets. Method 600 may be performed by network accelerator 104 of FIG. 1. For example, the operations described in connection with FIG. 6 may be performed by controller 204 of packet processing circuitry 132. FIG. 6 illustrates an example implementation in which the controller utilizes the metadata for packets and the additional fields in the rules of the flow table to process packets.

In block 602, the controller receives a packet. The packet may be from the host computer (e.g., be received back from the host computer) or from the network. In block 604, the controller performs a lookup in the flow table. For example, the controller is capable of determining the specified tuples from the received packet that are used to index into the flow table to perform the lookup. The controller performs the lookup in the flow table using the tuples from the received packet.

In block 606, the controller determines whether the packet matches a rule in the flow table of the network accelerator. In response to determining that the packet matches a rule, method 600 continues to block 610. In response to determining that the packet does not match any rule in the flow table, method 600 continues to block 608.

In block 608, the controller sets the last_pkt_flag of the packet to false. For example, the controller is capable of adding metadata to any packet that is to be forwarded to the host computer. Accordingly, in block 608 the controller adds metadata to the packet. The metadata includes the last_pkt_flag. In doing so, the controller sets the last_pkt_flag in the metadata for the packet to false.

Continuing to block 630, the controller forwards the packet to the host computer. In block 632, the host computer determines the rule to be used to process the packet. For example, the packet received from the network accelerator belongs to flow X. The host computer determines the rule for processing packets of flow X. The host computer updates the flow table in the network accelerator by adding the newly determined rule for flow X. In block 634, the host computer forwards the packet back to the network accelerator. The host computer may forward the packet back to the network accelerator with the metadata for the packet including the last_pkt_flag. After block 634, method 600 loops back to block 602 to continue processing.

Continuing with block 610, in the case where the packet did match a rule in the flow table of the network accelerator, the controller determines whether the packet was received from the host computer. In response to determining that the packet is from the host computer, method 600 proceeds to block 612. In response to determining that the packet was not received from the host computer (e.g., the packet was received from the network), method 600 continues to block 620. In one aspect, packets received from the host computer will already have metadata, whereas packets received from the network will not. Still, the controller may apply other processing to the packet to determine the source from which the packet was received.

In block 612, in response to determining that the packet was received from the host computer, the controller determines whether the last_pkt_flag of the packet is true. In response to determining that the last_pkt_flag of the packet is not true, method 600 continues to block 618 where the controller processes the packet per the matched rule and forwards the processed packet to the destination port specified by the matched rule. In general, the controller operates on packets received from the host computer for which a rule has been put in place in the flow table. After block 618, method 600 loops back to block 602 to continue processing packets.

In response to determining that the last_pkt_flag of the packet is true, method 600 continues to block 614. In block 614, the controller sets the last_pkt_recv field of the matched rule to true. In block 616, in response to performing block 614, the controller is capable of processing the packet per the matched rule and forwarding the processed packet to the destination port specified by the matched rule. Further, the controller is capable of sending any queued packets for the flow corresponding to the matched rule to the destination port specified by the matched rule following the packet with the last_pkt_flag set to true. Thus, the queued packets for the flow are forwarded to the destination port subsequent to forwarding the last packet of the flow that was provided to the host system. After block 616, method 600 loops back to block 602 to continue processing packets.

Continuing with block 620, in the case where the packet was not received from the host computer (e.g., the packet is from the network), the controller determines whether the last_pkt_sent field and the last_pkt_recv field both are true. In response to determining that both fields are true, method 600 continues to block 618. When both the last_pkt_sent field and the last_pkt_recv field are true, the flow table has been updated with a rule for processing the flow to which the packet belongs. Further, the packet with the last_pkt_flag set to true has been received back from the host computer. Accordingly, in block 618, the controller processes the packet per the matched rule and forwards the processed packet to the destination port specified by the matched rule. In proceeding from block 620 to block 618, queueing of packets for the flow (e.g., flow X) has been discontinued.

In response to determining that both fields are not true in block 620, method 600 continues to block 622. In block 622, the controller determines whether both the the last_pkt_sent field and the last_pkt_recv field are false. In response to determining that either the last_pkt_sent field or the last_pkt_recv field is true, method 600 continues to block 624. In that case, the last packet with the last_pkt_flag set to true has been sent to the host processor but not yet received back from the host processor. Accordingly, in block 624 the controller processes the packet per the matched rule in the flow table. The controller, for example, may modify the packet per the matched rule. Further, the controller stores the packet in a queue rather than forward the packet to the destination port. After block 624, method 600 continues to block 602 to continue processing further packets.

In response to determining that both the last_pkt_sent field and the last_pkt_recv field are false (e.g., both are not true) in block 622, method 600 continues to block 626. In block 626, the controller sets the last_pkt_sent field of the matched rule to true within the flow table. In block 628, the controller sets the last_pkt_flag of the packet to true. As discussed, in performing block 628, the controller adds the metadata including the last_pkt_flag to the packet. In block 630, the controller forwards the packet, including the metadata added in block 628, to the host computer. In block 632, the host computer determines the rule for the flow of the packet. In this scenario, the host computer has already provided the new rule for the flow to the network accelerator and, as such, foregoes updating of the flow table of the network accelerator. In block 634, the host computer forwards the packet to the network accelerator. The packet may be forwarded with the metadata for the packet including the last_pkt_flag. After block 634, method 600 loops back to block 602 to continue processing further packets.

Figure 7:
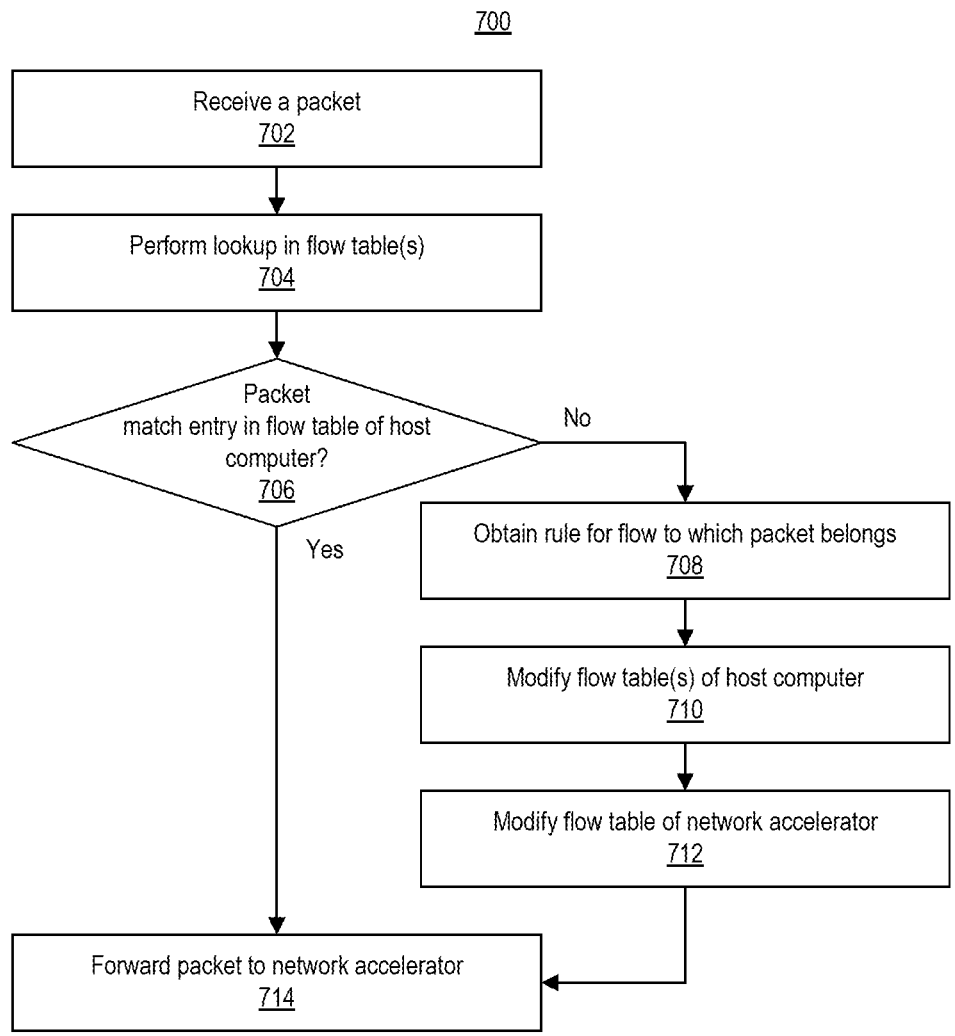
FIG. 7 illustrates another example method of processing packets.

FIG. 7 illustrates an example method 700 of processing packets. Method 700 may be performed by host computer 102 and, more particularly, by host processor 106 of FIG. 1. Method 700 may begin in block 702 where the host processor receives a packet from the network accelerator. As discussed, packets received from the network accelerator include metadata that includes the last_pkt_flag.

In block 704, the host processor performs a lookup for the received packet in the flow table(s) maintained in and/or by the host computer. In block 706, the host processor determines whether the packet matches an entry in the host flow table(s) of the host computer. If so, method 700 continues to block 714. If not, method 700 proceeds to block 708.

In block 708, the host processor determines the rule for the flow to which the packet belongs. The host processor, for example, may execute application software that is capable of generating or determining the new rule for the flow. The host processor may also query another system or data source to obtain the rule (e.g., one external to the host computer).

In block 710, the host processor modifies the flow table(s) of the host computer. For example, the host processor adds the new rule to the flow table(s) contained in, or coupled to, the host computer. In block 712, the host processor modifies the flow table of the network accelerator. For example, the host processor adds the new rule to the flow table contained in the network accelerator.

Continuing with block 714, whether proceeding from block 706 or from block 712, the host processor forwards the packet to the network accelerator.

As discussed, the packet processing circuitry 132 may be implemented as any of a variety of different devices. In one aspect, packet processing circuitry 132 may be implemented as an IC that includes hardened (e.g., hardwired or non-programmable logic). In another aspect, packet processing circuitry 132 may be implemented as an IC that includes programmable logic or that includes a combination of programmable logic and hardened circuitry.

Figure 8:
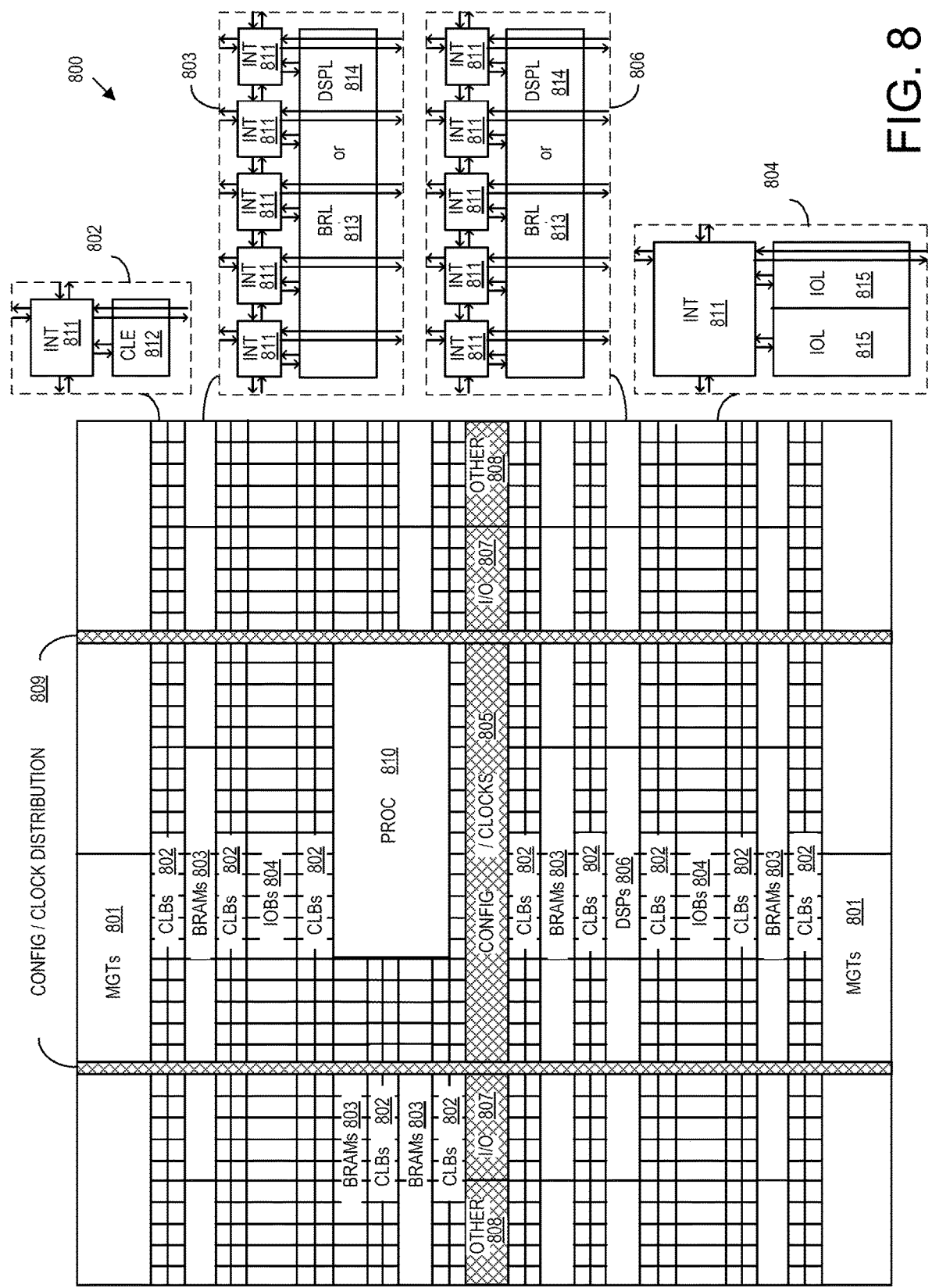
FIG. 8 illustrates an example architecture for an integrated circuit.

FIG. 8 illustrates an example architecture 800 for an IC. In one aspect, architecture 800 may be implemented within a programmable IC. For example, architecture 800 may be used to implement an FPGA. Architecture 800 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor. In any case, an IC or other device having an architecture the same as or similar to that of FIG. 8 may be used to implement packet processing circuitry 132 of FIG. 1.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the right of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An IOB 804 may include, for example, two instances of an I/O logic element (IOL) 815 in addition to one instance of an INT 811. The actual I/O pads connected to IOL 815 may not be confined to the area of IOL 815.

In the example pictured in FIG. 8, a horizontal area near the center of the die, e.g., formed of regions 805, 807, and 808, may be used for configuration, clock, and other control logic. Vertical areas 809 extending from this horizontal area may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 810.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration bitstream, load the configuration bitstream into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 8 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

Referring to FIGS. 2 and 8, queue 208 and/or flow table 206 may be implemented using architecture 800 using BRAMs or other memory elements included in architecture 800. Various I/Os (e.g., MGTs 801) may be used to form bus interface 202 and/or network interface 210. In particular embodiments, one or both of bus interface 202 and network interface 210 may be hardwired (e.g., as I/Os 807). Controller 204 may be implemented using programmable logic or as hardwired circuitry.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event.

The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include, in response to determining that a flow table of a network accelerator does not include any rules corresponding to first packet data of a first flow received from a network, forwarding the first packet data to a host computer. The method can also include, subsequent to the flow table being updated to include a new rule for the first flow, for second packet data of the first flow received from the network, processing the second packet data using the new rule and queuing the second packet data. The method further can include, in response to receiving the first packet data from the host computer, processing the first packet data using the new rule and forwarding the first packet data to a destination port followed by the queued second packet data.

The foregoing and other implementations can each optionally include one or more of the following features, alone or in combination. Certain implementations may include all the following features in combination.

The method can include updating the flow table with the new rule.

The first packet data and the second packet data can be provided to the destination port in a same order as received by the network accelerator from the network.

The method can include setting a last packet flag of a last packet of the first packet data to true prior to sending the last packet to the host computer.

The method can include updating a first field of the new rule to indicate whether the last packet with the last packet flag set to true has been sent to the host computer and a second field indicating whether the last packet with the last packet flag set to true has been received back from the host computer.

The queued second packet data can be forwarded to the destination port in response to determining that the last packet of the first packet data is received from the host computer with the last packet flag set to true.

The method can include, for further packets of the first flow received from the network subsequent to the flow table being updated to include the new rule, discontinuing the queuing.

The further packets of the first flow can be processed based on the new rule and forwarded to the destination port.

In another aspect, a system can include a controller. The controller is configured to initiate operations. The operations can include, in response to determining that a flow table does not include any rules corresponding to first packet data of a first flow received from a network, forwarding the first packet data to a host computer. The operations also can include, subsequent to the flow table being updated to include a new rule for the first flow, for second packet data of the first flow received from the network, processing the second packet data using the new rule and queuing the second packet data. The operations further can include, in response to receiving the first packet data from the host computer, processing the first packet data using the new rule and forwarding the first packet data to a destination port followed by the queued second packet data.

The foregoing and other implementations can each optionally include one or more of the following features, alone or in combination. Certain implementations may include all the following features in combination.

The system can include a network interface coupled to the controller, wherein the network interface is configured to send and receive the first and second packet data over the network.

The system can include a bus interface coupled to the host computer, wherein the bus interface is configured to send the first packet data to the host computer and receive the first packet data from the host computer.

The system can include one or more memories coupled to the controller, wherein the one or more memories store the flow table, and wherein the flow table includes one or more packet processing rules.

The one or more memories can implement a queue used for the queuing of the second packet data.

The first packet data and the second packet data can be provided to the destination port in a same order as received by the system from the network.

The controller can be configured to initiate operations including setting a last packet flag of a last packet of the first packet data to true prior to sending the last packet to the host computer.

The controller can be configured to initiate operations including updating a first field of the new rule to indicate whether the last packet with the last packet flag set to true has been sent to the host computer and a second field indicating whether the last packet with the last packet flag set to true has been received back from the host computer.

The queued second packet data can be forwarded to the destination port in response to determining that the last packet of the first packet data is received from the host computer with the last packet flag set to true.

For further packets of the first flow received from the network subsequent to the flow table being updated to include the new rule, the controller is configured to discontinue the queuing.

The further packets of the first flow can be processed based on the new rule and forwarded to the destination port.

The controller can be implemented using programmable logic.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
in response to determining that a flow table of a network accelerator does not include any rules corresponding to first packet data of a first flow received from a network, forwarding the first packet data to a host computer;
subsequent to the flow table being updated by the host computer to include a new rule for the first flow, for second packet data of the first flow received from the network subsequent to the first packet data, processing the second packet data using the new rule and queuing the second packet data; and in response to receiving the first packet data back from the host computer, processing the first packet data using the new rule and forwarding the first packet data to a destination port followed by the queued second packet data.

2. The method of claim 1, further comprising:
updating the flow table with the new rule.

3. The method of claim 1, wherein the first packet data and the second packet data are provided to the destination port in a same order as received by the network accelerator from the network.

4. The method of claim 1, further comprising:
setting a last packet flag of a last packet of the first packet data to true prior to sending the last packet to the host computer.

5. The method of claim 4, further comprising:
updating a first field of the new rule to indicate whether the last packet with the last packet flag set to true has been sent to the host computer and a second field indicating whether the last packet with the last packet flag set to true has been received back from the host computer.

6. The method of claim 4, wherein the queued second packet data are forwarded to the destination port in response to determining that the last packet of the first packet data is received from the host computer with the last packet flag set to true.

7. The method of claim 6, further comprising:
for further packets of the first flow received from the network subsequent to the flow table being updated to include the new rule, discontinuing the queuing.

8. The method of claim 7, wherein the further packets of the first flow are processed based on the new rule and forwarded to the destination port.

9. A system, comprising:
a hardware controller configured to initiate operations including:
in response to determining that a flow table does not include any rules corresponding to first packet data of a first flow received from a network, forwarding the first packet data to a host computer;
subsequent to the flow table being updated by the host computer to include a new rule for the first flow, for second packet data of the first flow received from the network subsequent to the first packet data, processing the second packet data using the new rule and queuing the second packet data; and
in response to receiving the first packet data back from the host computer, processing the first packet data using the new rule and forwarding the first packet data to a destination port followed by the queued second packet data.

10. The system of claim 9, further comprising:
a network interface coupled to the controller, wherein the network interface is configured to send and receive the first and second packet data over the network.

11. The system of claim 9, further comprising:
a bus interface coupled to the host computer, wherein the bus interface is configured to send the first packet data to the host computer and receive the first packet data from the host computer.

12. The system of claim 9, further comprising:
one or more memories coupled to the controller, wherein the one or more memories store the flow table, and wherein the flow table includes one or more packet processing rules.

13. The system of claim 12, wherein the one or more memories implement a queue used for the queuing of the second packet data.

14. The system of claim 12, wherein the first packet data and the second packet data are provided to the destination port in a same order as received by the system from the network.

15. The system of claim 12, wherein the controller is configured to initiate operations including:
setting a last packet flag of a last packet of the first packet data to true prior to sending the last packet to the host computer.

16. The system of claim 15, wherein the controller is configured to initiate operations including:
updating a first field of the new rule to indicate whether the last packet with the last packet flag set to true has been sent to the host computer and a second field indicating whether the last packet with the last packet flag set to true has been received back from the host computer.

17. The system of claim 15, wherein the queued second packet data are forwarded to the destination port in response to determining that the last packet of the first packet data is received from the host computer with the last packet flag set to true.

18. The system of claim 17, wherein for further packets of the first flow received from the network subsequent to the flow table being updated to include the new rule, the controller is configured to discontinue the queuing.

19. The system of claim 18, wherein the further packets of the first flow are processed based on the new rule and forwarded to the destination port.

20. The system of claim 18, wherein the controller is implemented using programmable logic.

* * * * *